United States Patent
Krishnamachari et al.

(10) Patent No.: US 6,859,815 B2
(45) Date of Patent: Feb. 22, 2005

(54) APPROXIMATE INVERSE DISCRETE COSINE TRANSFORM FOR SCALABLE COMPUTATION COMPLEXITY VIDEO AND STILL IMAGE DECODING

(75) Inventors: Santhana Krishnamachari, Ossining, NY (US); Shaomin Peng, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 631 days.

(21) Appl. No.: 09/741,724

(22) Filed: Dec. 19, 2000

(65) Prior Publication Data

US 2002/0111978 A1 Aug. 15, 2002

(51) Int. Cl.$^7$ .......................... G06F 17/14; G06F 15/00
(52) U.S. Cl. ...................... 708/400; 708/200
(58) Field of Search .................. 708/400–409, 708/200

(56) References Cited

U.S. PATENT DOCUMENTS

| | | | |
|---|---|---|---|
| 4,449,194 A | * 5/1984 | Wilhelm | 708/402 |
| 4,849,922 A | * 7/1989 | Riolfo | 708/402 |
| 5,285,402 A | 2/1994 | Keith | |
| 5,361,220 A | 11/1994 | Asano | |
| 5,523,847 A | 6/1996 | Feig et al. | |
| 5,629,882 A | * 5/1997 | Iwata | 708/402 |
| 5,654,910 A | * 8/1997 | Iwata | 708/402 |
| 5,737,256 A | 4/1998 | Nakagawa et al. | |
| 5,805,476 A | * 9/1998 | Kim et al. | 708/200 |
| 5,864,494 A | * 1/1999 | Toyoyama et al. | 708/402 |
| 5,964,824 A | 10/1999 | Murata et al. | |
| 5,999,958 A | 12/1999 | Chen et al. | |
| 6,223,195 B1 | * 4/2001 | Tonomura | 708/402 |

FOREIGN PATENT DOCUMENTS

WO      WO9957906      11/1999

OTHER PUBLICATIONS

Chien et al., A Low–voltage Micropower Asynchronous Multiplier for a Multiplierless FIR filter, 2003, IEEE, pp. V–381–V–384.*

Sadiq et al., A Novel Technique for Fast Multiplication, 1995, IEEE, pp. 109–114.*

* cited by examiner

Primary Examiner—Kakali Chaki
Assistant Examiner—Chat C. Do

(57) ABSTRACT

A method of scaling image and video processing computational complexity according to the maximum available quantities of computational includes performing a plurality of data multiplications which processes digital image and video data, the performance of each data multiplication requiring a predetermined quantity of computational resource units; selecting one of the data multiplications; selecting a shift/add-, a shift/subtract or a shift-operation using a data independent value associated with the selected multiplication that requires a quantity of computational resource units which is less than the predetermined quantity of computational resource units required for performing the selected multiplication; and performing the selected multiplication with the selected operation. Also, a decoder which scales video and still image decoding computational complexity with available computational resources according to the above method.

25 Claims, 3 Drawing Sheets

APPROXIMATE INVERSE DISCRETE COSINE TRANSFORM FOR SCALABLE COMPUTATION COMPLEXITY VIDEO AND STILL IMAGE DECODING

FIELD OF THE INVENTION

This invention relates to video and still image decoding and in particular to an approximate inverse discrete cosine transform for scaling video and still image decoding computational complexity in accordance with available quantities of computational resource units and a decoder which utilizes the same.

BACKGROUND OF THE INVENTION

As Digital Television (DTV) expands worldwide and gradually dominates the TV market, the demand for flexible architecture and scalable computation will become greater. The impetus to adopt flexible architecture is lead by the availability of a more powerful digital signal processing central processing unit (DSPCPU) core and the increasing demand for new functionality. As the computational power of the DSPCPU core increases over time, video-processing functions will tend to migrate from hardware implementations on coprocessors to software implementations on the DSPCPU core. At the same time, the emergence of new audio/visual processing functionality will mandate the application of coprocessors.

Software implementation of audio/video processing functions on the DSPCPU core, creates opportunities for algorithm scalability by allowing trade-off between the usage of available computational resources (i.e. CPU cycles, cache, memory size, memory bandwidth, coprocessor load, etc.) and subjective image quality. Although the DSPCPU core is getting more and more powerful, reducing cost by constraining CPU usage while still generating satisfactory results is a big challenge for video algorithm designs driven by consumer electronics.

The application of scalable video algorithms (SVAs) will allow multiple video functions to run concurrently on the DSPCPU core and the coprocessors while the total computational resources are on constraint. SVAs can also lead to the reduction of coprocessors and other external hardware. The system cost is then reduced with smaller silicon area of the multimedia processor chip.

One potential application for SVAs is in video decoders. Video decoders should be capable of decoding incoming compressed digital video signals at real-time speed. In a typical application such as a set-top box, the computational resource available for video decoding varies over time because the total available resource has to be divided among many different tasks. When the computational resource available at any given time is insufficient, the decoder should then intelligently adapt the complexity of the decoding algorithm, albeit, with some loss in the visual quality of the decoded video.

The most prevalently used compression techniques for digital video and images are MPEG and JPEG respectively. Both these techniques use the block based DCT as one of the basic blocks in the compression. A video decoder performs the following algorithmic steps in decoding video: variable length decoding, inverse quantization, inverse DCT (IDCT) and motion compensation. The IDCT requires a substantial portion of the computational resource and by using an approximate algorithm its complexity can be adapted to scale to the available resource.

Techniques to reduce the IDCT complexity based on input data are known. These techniques classify the input data into different categories and use different IDCT algorithms of varying complexities for different categories of data. However such techniques have the additional overhead of classifying the input data into the selected categories.

Accordingly, a need exists for an IDCT having a complexity which scales to the computational resources available in the microprocessor of the decoder at any given time and which is input data-independent.

SUMMARY OF THE INVENTION

A method of scaling image and video processing computational complexity in accordance with maximum available quantities of computational resource units, the method comprising the steps of: performing a plurality of data multiplications which processes digital image and video data, each data multiplication having a data dependent value multiplied by data independent value, the performance of each data multiplication requiring a predetermined quantity of computational resource units; selecting one of the data multiplications; selecting a shift/add-operation, a shift/substract-operation, or a shift-operation using the data independent value associated with the selected multiplication that requires a quantity of computational resource units which is less than the predetermined quantity of computational resource units required for performing the selected multiplication; and approximating the selected multiplication with the selected operation.

Also described herein is a decoder which scales video and still image decoding computational complexity with available computational resources. The decoder comprises a variable length decoder; an inverse quantizer which dequantizes signals received from the variable length decoder; and an approximate inverse discrete cosine transform that scales decoding computational complexity in accordance with the above method.

BRIEF DESCRIPTION OF THE DRAWINGS

The advantages, nature, and various additional features of the invention will appear more fully upon consideration of the illustrative embodiments now to be described in detail in connection with accompanying drawings where like numerals are used to identify like elements and wherein.

DETAILED DESCRIPTION OF THE INVENTION

The present invention sets forth an approximate inverse discrete cosine transform (IDCT) for digital video and still image decoding as respectively used in MPEG and JPEG compression/decompression techniques. Conventional IDCTs utilize algorithms with fixed computational complexities to process data. Therefore, conventional IDCTs can not scale their computational complexity to the computational resources that are available in the microprocessor of the decoder at any given time.

The approximate IDCT of the present invention utilizes an algorithmic process whose complexity scales to the computational resources available in the microprocessor of the decoder at any given time. Hence, the approximate IDCT of the invention can be utilized in MPEG and JPEG to enable scalable computation decoding of digital video and still images respectively which is not possible with conventional IDCTs that utilize algorithmic processes of fixed computational complexity.

Figure 1:
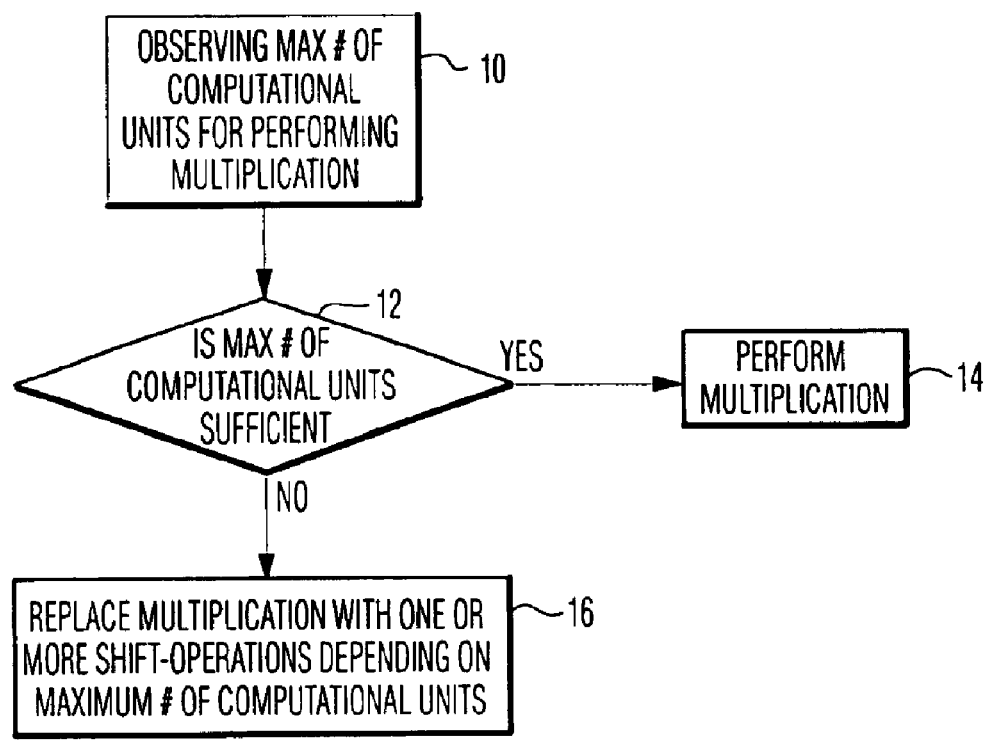
FIG. 1 is a block diagram illustrating the steps performed by the approximate IDCT of the present invention.

FIG. 1 is a block diagram illustrating the steps performed by the approximate IDCT of the present invention to provide complexity scaling. In step 10, the maximum number of available computational units is observed for each multiplication to be performed by the IDCT. Step 12 it determines whether the maximum number of computational units available (the maximum computational complexity available) for each multiplication is sufficient. If it is determined that the maximum number of available computational units is sufficient, the multiplication is performed in step 14. If it is determined that the maximum number of available computational units is insufficient, then in step 16 multiplications are replaced by one or more shift/add-operations, shift/substract-operations, or a shift-operation (all three of these operations being collectively referred to hereinafter as shift-operation) the exact number and type of such operations being dependent upon the maximum number of computational units required therefore.

Note that a multiplication requires approximately three times the number of cycles to perform as compared to an addition, a subtraction, or a shift-operation in popular INTEL architecture processors.

In particular, if it is determined that the number of computational units required for performing multiple shift/add-operations, shift/subtract-operations, or a shift-operation is greater than or equal to that required for the multiplication, the multiplication is approximated with an abbreviated shift-operation. Approximation is typically performed when the multiplication is by a value that is not a single power of two. Such a multiplication may involve a shift-operation comprised of two or more shifts, the results of which are then added or subtracted. The abbreviated shift-operation of the present invention neglects one or more of these shifts and additions/subtractions to scale the complexity of the IDCT to the available computational units.

In order to illustrate the concepts of the present invention, the following discussion references a DCT/IDCT algorithm adopted from the original Chen-Wang algorithm described by W. H. Chen, C. H. Smith, S. Fralick, "A Fast Computational Algorithm For The Discrete Cosine Transform," IEEE Transactions on Communications, Vol. COM-25, No. 9, pp. 1004–1009, September, 1977 and by Z. Wang, "Reconsideration Of A Fast Computational Algorithm For The Discrete Cosine Transform," IEEE Transactions on Communications, Vol. COM-31, pp. 121–123, January 1983. The reference C code of the Chen-Wang algorithm can be found in the C code of a decoder used at the University of California, at Berkeley. The decoder performs an IDCT based on a multi-stage network. It should be understood, however, that the present invention can be applied to any IDCT including IDCTs which use matrix multiplications to obtain a 2-D IDCT directly or IDCTs which use two 1-D IDCTs, one of which is performed over the rows and the other which is performed over the columns. Moreover, the present invention can also be applied to DCTs or any other computer computation involving multiplications.

Typically the above IDCT is performed on a two-dimensional block of 8 by 8 pixels. In this implementation the two dimensional IDCT is achieved by performing one-dimensional IDCT on the columns followed by one-dimensional IDCT on the rows. The following set of equations as provided below in Table 1 shows the four states of a 4-stage network. The first column of equations corresponds to the operations performed in the first stage and so forth.

TABLE 1

| Stage I | Stage II |
|---|---|
| $T_8 = w_7 * (x_4 + x_5)$ | $Y_8 = x_0 + x_1$ |
| $Y_4 = T_8 + x_4 * (w_1 - w_7)$ | $Y_0 = x_0 - x_1$ |
| $Y_5 = T_8 - x_4 * (w_1 + w_7)$ | $T_1 = w_6 * (x_3 + x_2)$ |
| $T_8 = w_3 * (x_6 + x_7)$ | $Y_2 = T_1 - (w_2 + w_6) * x_2$ |
| $Y_6 = T_8 - x_6 * (w_3 - w_5)$ | $Y_3 = T_1 + (w_2 - w_6) * x_3$ |
| $Y_7 = T_8 - x_7 * (w_3 + w_5)$ | $Y_1 = x_4 + x_6$ |
| $Y_1 = x_1$ | $Y_4 = x_4 - x_6$ |
| $Y_2 = x_2$ | $Y_6 = x_5 + x_7$ |
| $Y_3 = x_3$ | $Y_5 = x_5 - x_7$ |
| $Y_0 = x_0$ | |
| Stage III | Stage IV |
| $Y_7 = x_8 + x_3$ | $Y_0 = (x_7 + x_1) >> 8$ |
| $Y_8 = x_8 - x_3$ | $Y_1 = (x_3 + x_2) >> 8$ |
| $Y_3 = x_0 + x_2$ | $Y_2 = (x_0 + x_4) >> 8$ |
| $Y_0 = x_0 - x_2$ | $Y_3 = (x_8 + x_6) >> 8$ |
| $Y_2 = (181 * (x_4 + x_5) + 128) >> 8$ | $Y_4 = (x_8 - x_6) >> 8$ |
| $Y_4 = (181 * (x_4 - x_5) + 128) >> 8$ | $Y_5 = (x_0 - x_4) >> 8$ |
| $Y_1 = x_1$ | $Y_6 = (x_3 - x_2) >> 8$ |
| $Y_6 = x_6$ | $Y_7 = (x_7 - x_1) >> 8$ |

Here $x_1$ are the inputs and $Y_1$ are the outputs of each stage and $T_1$ are temporary variables that are computed. Also, the output of each stage is the input to the subsequent stage, i.e. the output of the first stage is the input of the second stage and so on. The $x_1$ and $Y_1$ values are dependent on the received bitstream data. The $w_1$ values are independent of the received bitstream data and these values are replaced or approximated with shift-operations in accordance with the present invention. Accordingly, the approximate IDCT of the present invention is input data-independent, hence, avoiding the additional overhead in terms of computational resources of classifying the input data into selected categories as required in prior IDCT complexity reduction techniques.

As shown in the above set of equations, the operations in stage I require 6 multiplications, 6 additions and no shift-operations. In accordance with an illustrative implementation of the principles of the present invention, if there are insufficient computational resources or units available for performing a multiplication by $w_i$ in stage I, the multiplication can be replaced or approximated by with a shift operation as described above.

As described earlier, a multiplication can be replaced with a shift-operation if $w_i$ is a value that is equal to a single power of two because the shift-operation requires only a single shift with no additions or subtractions. Specifically, if $w_7$ in the first equation of stage I is 64, the multiplication by $w_7$ can be replaced with a single shift with no additions or subtractions because 64 is equal to a single power of two or $2^6$. Accordingly, multiplication by 64 can be achieved by left shifting the value of $(x_4+x_5)$ by 6. Assuming for example, a multiplication requires 3 computational units and a single-shift operation requires 1 computational unit, then the above shift-operation provides a savings of 2 computational units.

If $w_1$, is a value that is not equal to a single power of two, the multiplication by $w_1$ can be replaced with a set of shift-operations and additions or subtractions if the maximum number of computational units available for the multiplication are insufficient and the number of computational units required for the shift-operations are less than what is required for the multiplication. As described earlier, values that are not equal to a single power of two can be decomposed or split into a sum of values each of which is a power of two. In particular, if $w_7$ in the first equation of stage I is 84 (which is not a single power of two), 84 can be split into the sum of three values each of which is a power of two or 64 ($2^6$)+16 ($2^4$)+4 ($2^2$). Multiplication by 84 is therefore achieved by multiplying the value of ($x_4+x_5$) by 64, 16 and 4 and adding the results. Each of these multiplications can be achieved in the approximate IDCT of the present invention through a shift-operation, i.e. 64 * ($x_4+x_5$) is achieved by left shifting the value of ($x_4+x_5$) by 6, 16 * ($x_4+x_5$) is achieved by left shifting the value of ($x_4+x_5$) by 4 places, 4 * ($x_4+x_5$) is achieved by left shifting ($x_4+x_5$) by 2. Accordingly, multiplication by 84 is replaced by 3 shift-operations and 2 additions.

However, the replacement of the multiplication is performed in the present invention only if the computational resources or units required by the shift-operations and the additions is less than that required by a multiplication. If the computational resources required for the 3 shift-operations and 2 additions is not less than that required by the multiplication, then the multiplication is approximated by omitting some of the shifts and additions. Assuming again that an addition and a shift-operation are each equivalent to 1 unit of computation and a multiplication is equivalent of 3 units of computation, then the shift-operation actually requires 5 units of computation which is 2 more than the multiplication. Accordingly, an abbreviated shift-operation which omits the shifts involving the values 16 and 4 would be performed to approximate the multiplication by 84.

The above process can be used in one or more of the other multiplications in stage I as well as the multiplications in the other stages, depending upon how much scaling back of the computational complexity is needed to accommodate the available computational resources.

The values that are not equal to a single power of two can also be decomposed or split into a "difference" of values each of which is a power of two. For example, if $w_7$ in the first equation of stage I is 63, 63 can be decomposed or split into 64 ($2^6$)−1 ($2^0$). The decision to select a decomposition made up of a sum or difference is typically based on which decomposition method requires less computational units to implement and is the best approximation of the multiplication. Using the above example, the multiplication by 63 can be replaced in its entirety by 2 shift-operations and 1 subtraction. A corresponding sum decomposition of 63 would equal 32 ($2^5$)+16 ($2^4$)+8 ($2^3$)+4 ($2^2$)+2 ($2^1$)+1 ($2^0$) which requires 6 shifts and 5 additions. Hence, in this example, the difference decomposition of 63 requires less computational units to implement in its entirety than the sum decomposition of 63. Assuming again that an addition and a shift-operation are each equivalent to 1 unit of computation and a multiplication is equivalent of 3 units of computation, an abbreviated shift operation using the difference decomposition of 63 would require one computational unit, thus providing a 2 computational unit savings over the multiplication with only a small loss in accuracy. An abbreviated shift operation using the sum decomposition of 63 would also require only 1 computational unit to implement but would involve a much greater loss of accuracy.

Figure 2:
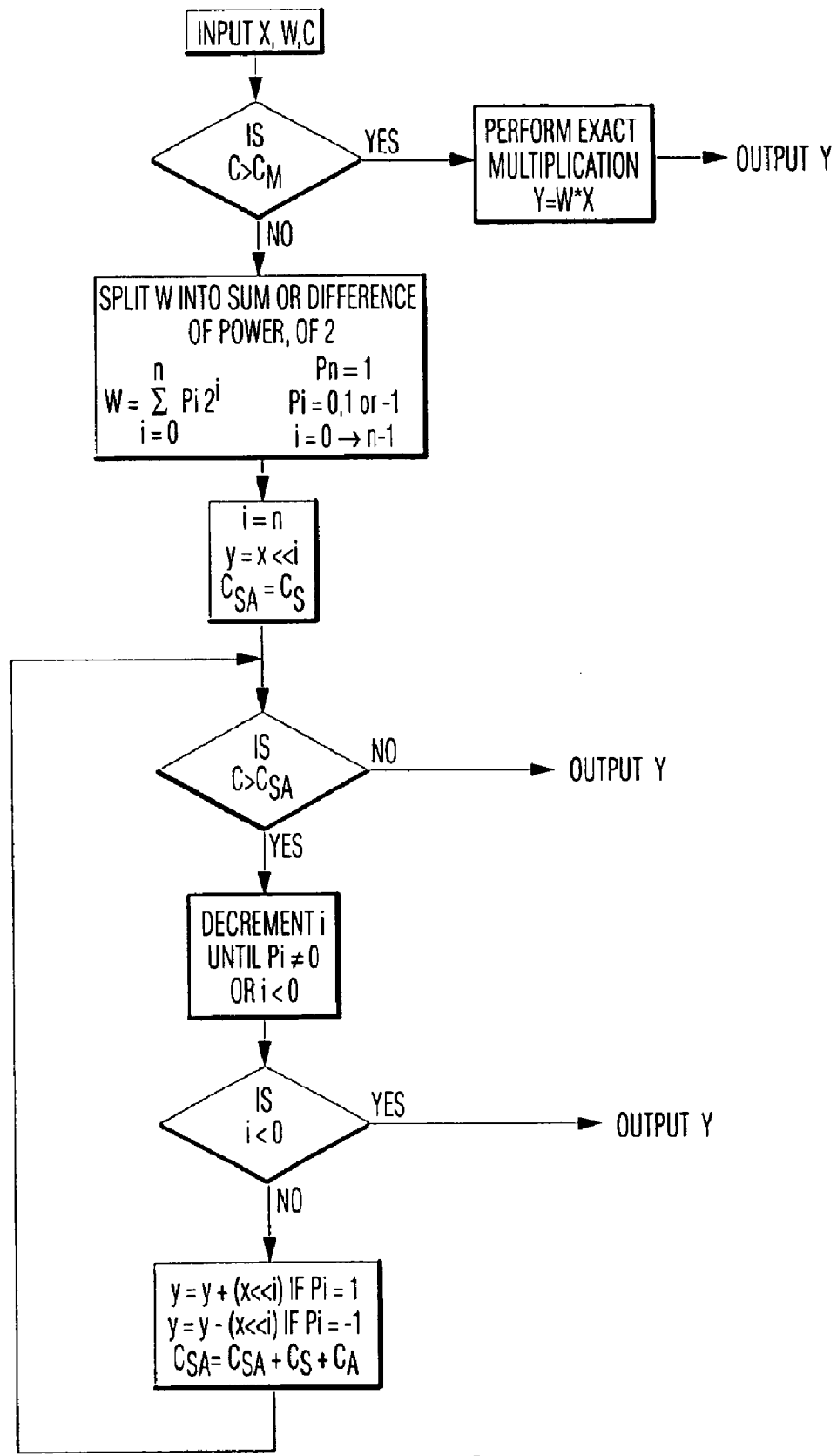
FIG. 2 is a flowchart which illustrates an exemplary implementation of the approximate IDCT of the present invention.

FIG. 2 is a flowchart which illustrates an exemplary implementation of the approximate IDCT of the present invention. In the flow chart, C is the maximum number of computational units available for the multiplication (the maximum computation complexity available for the multiplication), $C_m$ is the number of computational units required to perform the multiplication w * x without any approximation, $C_s$ is the number of computational units required for shifting, $C_a$ is the number of computational units required for adding or subtracting, and $C_{sa}$ is total number of computational units required for shifting, adding or subtracting the powers of two.

Figure 3:
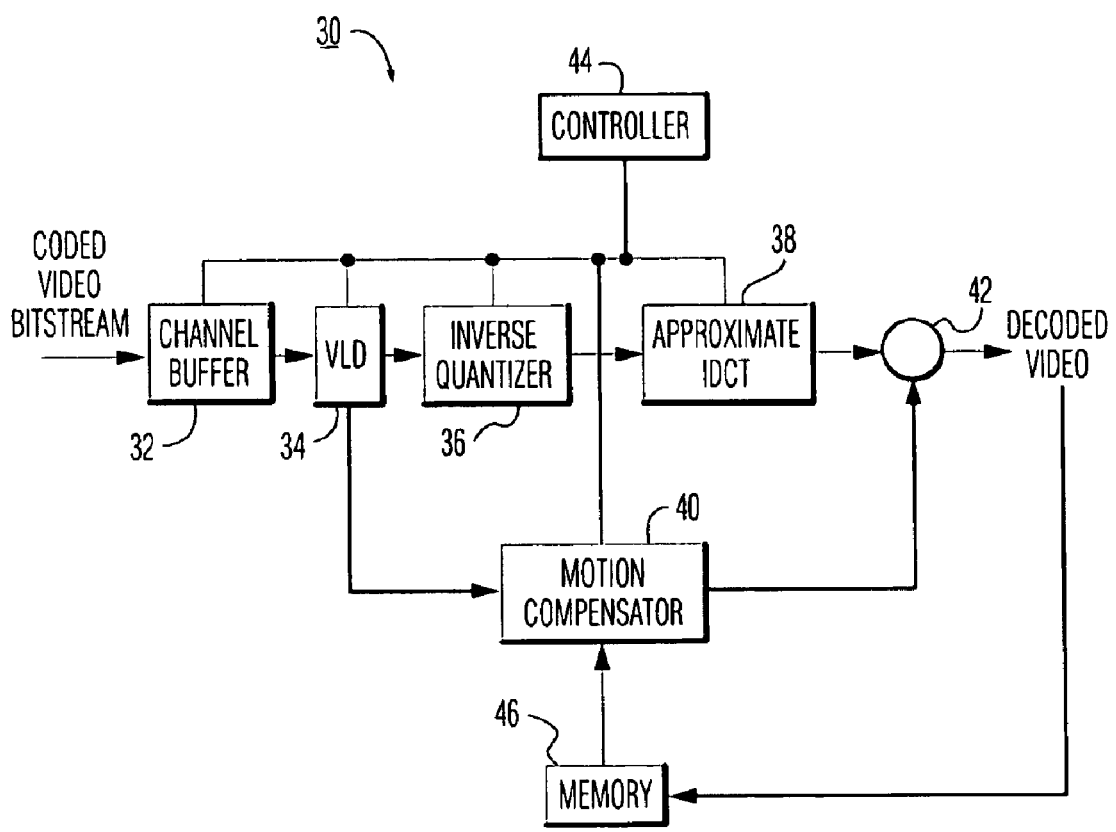
FIG. 3 is a schematic illustration of a video decoder in which the approximate IDCT of the present invention can be implemented.

FIG. 3 schematically illustrates a video decoder 30 in which the approximate IDCT of the present invention can be implemented. The video decoder 30 includes a channel buffer 32, a variable length decoder (VLD) 34, an inverse quantizer 36, the approximate IDCT 38 of the invention, a motion compensator 40, an adder 42 and a memory 46 for storing reference frames for motion compensation. The IDCT 38 of the invention enables the video decoder to scale its video decoding computational complexity with the computational resources available from the controller 44 of the decoder 30.

Table II below shows the number of multiplications, additions and shift-operations required by the four different stages of equations shown in Table I above. Assuming additions and shift-operations are equivalent to one unit of computation and a multiplication is equivalent to three units of computation, the total requirement is 74 units.

|  | Stage 1 | Stage II | Stage III | Stage IV |
|---|---|---|---|---|
| Number of Multiplications | 6 | 3 | 2 | 0 |
| Number of Additions | 6 | 9 | 8 | 8 |
| Number of Shift Operations | 0 | 0 | 2 | 8 |
| Total number of computation units | 24 | 18 | 16 | 16 |

In a preferred embodiment of the approximate IDCT of the present invention, computational complexity reduction through replacement or approximation of the multiplications required at different stages of a multistage network with shift-operations will now be described by referring again to earlier described four stage IDCT of Tables I and II. For the discussion here, all approximations utilizing abbreviated shift-operations are assumed to be accomplished with a single shift-operation. The multiplications in stage III are the preferred initial candidates to be replaced or approximated by shift-operations, since any approximations introduced at this stage propagates to only one more stage. If the two multiplications at stage III are replaced or approximated by shift-operations, then the total computation requirement is 70 units, or 70/74=94.6% of the original complexity. If the computational resources available from the controller of the decoder falls below 100% but stays above 94.6% then the decoder, via the approximate IDCT of the present invention will automatically replace or approximate the multiplications at stage III to scale to the current resource availability.

If the computational resources fall below 94.6%, the multiplications in stage II are also replaced or approximated by shift-operations in addition to the stage III replacements and approximations. If the three multiplications in stage II and the two in Stage III are replaced or approximated by shift-operations, the total computational requirement will be 64, which is 86.5%, of the original complexity.

If the computational resource falls below 86.5%, then all the multiplications in all the stages are replaced or approximated by shift-operations. Accordingly, the resulting computational requirement will be 52 units, or 70.3% of the original complexity.

Using the approximate IDCT process of the present invention, the computational requirement can be scaled to three different levels of 94.6%, 86.5% and 70.3% by replacing or approximating the multiplications at different stages with shift-operations. To obtain more levels of scalability, some of the multiplications (and not all) in each stage can be replaced or approximated. For example, to achieve a complexity level that is less than 90% (but above 86.5%), two multiplications in Stage III and two in Stage II can be replaced or approximated with shift-operations. This will result in (66/74) 89.2% complexity. To select the two out of three multiplications that are to be approximated with shift-operations at Stage II, the error introduced in approximating multiplications with abbreviated shift-operations is calculated for each multiplication and the two multiplication approximations that result in the lower error values is selected. This process can be done a priori and is data independent.

While the foregoing invention has been described with reference to the above embodiments, various modifications and changes can be made without departing from the spirit of the invention. Accordingly, such modifications and changes are considered to be within the scope of the appended claims.

What is claimed is:

1. A method of scaling image and video processing computational complexity in accordance with system defined maximum available quantities of computational resource units, the method comprising the steps of:
   (a) performing a plurality of data multiplications which processes digital image and video data, each data multiplication having a data dependent value multiplied by data independent value, the performance of each data multiplication requiring a predetermined quantity of computational resource units;
   (b) selecting one of the data multiplications;
   (c) acquiring the maximum available quantity of computational resource units for performing the selected multiplication;
   (d) determining whether the maximum quantity of computational resource units available for the selected multiplication is sufficient for performing same;
   (e) performing the selected multiplication if the maximum quantity of computational resource units available for the selected multiplication is sufficient for performing same; or
   (f) selecting a shift-operation using the data independent value associated with the selected multiplication that requires a quantity of computational resource units which is less than the predetermined quantity of computational resource units required for performing the selected multiplication; and
   (g) performing the selected multiplication with the selected shift-operation.

2. The method according to claim 1, wherein the data independent value is a single power of two and the selected shift-operation includes a single shift made according to the single power of two.

3. The method according to claim 1, wherein the data independent value is a sum of powers of two and the selected shift-operation includes at least one shift-operation corresponding to one of the powers of the sum.

4. The method according to claim 3, wherein the at least one shift-operation approximates the selected multiplication.

5. The method according to claim 3, wherein the selected shift-operation includes at least two shift-operations the results of which are added, the at least two shift-operations corresponding to two of the powers of the sum.

6. The method according to claim 3, wherein the power of the sum corresponding to the at least one shift-operation has a value which is nearest to the data independent value.

7. The method according to claim 1, wherein the data independent value is a difference of powers of two and the selected shift-operation includes at least on shift-operation corresponding to one of the powers of the difference.

8. The method according to claim 7, wherein the at least one shift-operation approximates the selected multiplication.

9. The method according to claim 7, wherein the power of the difference corresponding to the at least one shift-operation has a value which is nearest to the data independent value.

10. The method according to claim 7, wherein the selected shift-operation includes at least two shift-operations the results of which are subtracted, the at least two shift-operations corresponding to two of the powers of the difference.

11. The method according to claim 1, wherein the plurality of data multiplications defines an inverse discrete cosine transform.

12. The method according to claim 1, wherein the plurality of data multiplications form a multiple stage network having an input and an output, the selected multiplication is selected from a stage of the network which is nearest the output thereof.

13. The method according to claim 1, wherein the image and video processing includes image and video decoding and the digital image and video data is encoded digital image and video data.

14. A method of approximating an inverse discrete cosine transform to scale its decoding computational complexity in accordance with system defined maximum available quantities of computational resource units, the transform decoding encoded digital image and video data by performing a plurality of data multiplications, each data multiplication having a data dependent value multiplied by data independent value, the performance of each data multiplication by the transform requiring a predetermined quantity of computational resource units, the method comprising the steps of:
   (a) selecting one of the data multiplications;
   (b) acquiring the maximum available quantity of computational resource units for performing the selected multiplication;
   (c) determining whether the maximum quantity of computational resource units available for the selected multiplication is sufficient for performing same;
   (d) performing the selected multiplication if the maximum quantity of computational resource units available for the selected multiplication is sufficient for performing same; or
   (e) selecting a shift-operation using the data independent value associated with the selected multiplication that requires a quantity of computational resource units which is less than the predetermined quantity of computational resource units required for performing the selected multiplication; and
   (f) performing the selected multiplication with the selected shift-operation.

15. The method according to claim 14, wherein the data independent value is a single power of two and the shift-operation includes a single shift made according to the single power of two.

16. The method according to claim 14, wherein the data independent value is a sum of powers of two and the selected shift-operation includes at least one shift-operation corresponding to one of the powers of the sum.

17. The method according to claim 16, wherein the at least one shift-operation approximates the selected multiplication.

18. The method according to claim 16, wherein the power of the sum corresponding to the at least one shift-operation has a value which is nearest to the data independent value.

19. The method according to claim 16, wherein the selected shift-operation includes at least two shift-operations the results of which are added, the at least two shift-operations corresponding to two of the powers of the sum.

20. The method according to claim 14, wherein the data independent value is a difference of powers of two and the selected shift-operation includes at least on shift-operation corresponding to one of the powers of the difference.

21. The method according to claim 20, wherein the at least one shift-operation approximates the selected multiplication.

22. The method according to claim 20, wherein the power of the difference corresponding to the at least one shift-operation has a value which is nearest to the data independent value.

23. The method according to claim 20, wherein the selected shift-operation includes at least two shift-operations the results of which are subtracted, the at least two shift-operations corresponding to two of the powers of the difference.

24. The method according to claim 14, wherein the transform forms a multiple stage network having an input and an output, the selected multiplication is selected from a stage of the network which is nearest the output thereof.

25. A decoder which scales video and still image decoding computational complexity with available computational resources, the decoder comprising:

a variable length decoder;

an inverse quantizer which dequantizes signals received from the variable length decoder; and an approximate inverse discrete cosine transform that scales decoding computational complexity in accordance with system defined maximum available quantities of computational resource units, wherein the transform decodes encoded digital image and video data by performing a plurality of data multiplications, each data multiplication having a data dependent value multiplied by a data independent value, the performance of each data multiplication by the transform requiring a predetermined quantity of computational resource units, the transform performing a selected one of the data multiplications if a determined maximum quantity of the computational resource units available for the selected data multiplication is sufficient for performing same, or the transform performing the selected data multiplication with a shift-operation that requires a quantity of computational resource units which is less than is required for performing the selected one data multiplication.

* * * * *